Dec. 4, 1934.   H. J. LAWRENCE   1,983,297
RESERVOIR FOR MERCURY INSTRUMENTS
Filed July 5, 1934
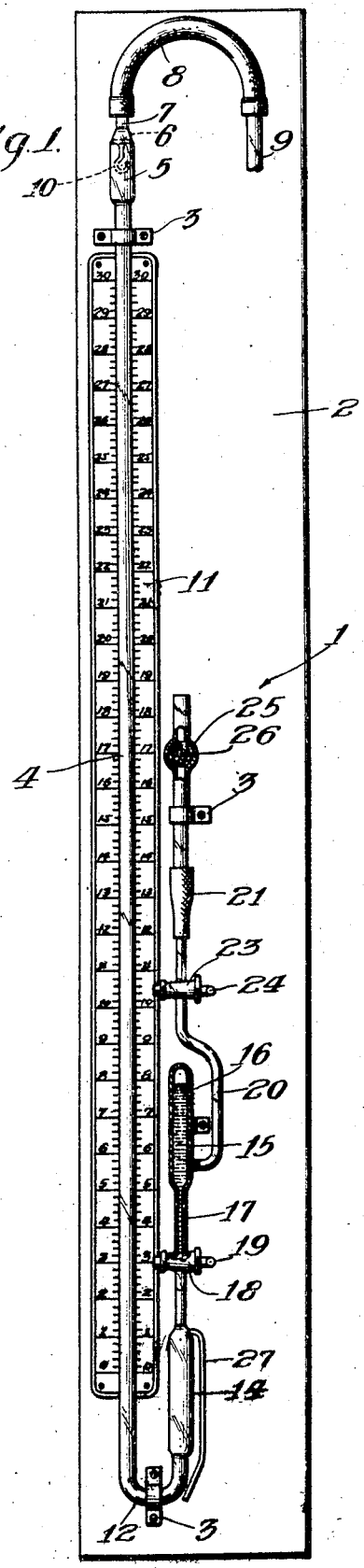
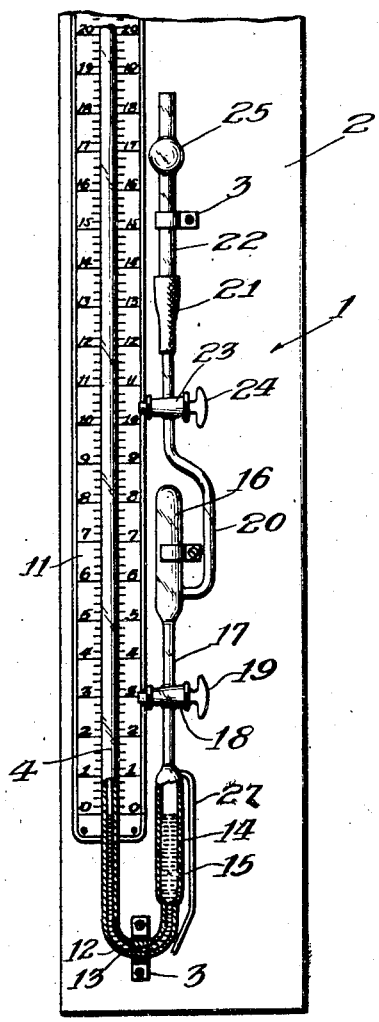
Inventor:
Harold J. Lawrence
By: Lee J. Gary
Attorney

Patented Dec. 4, 1934

1,983,297

UNITED STATES PATENT OFFICE

1,983,297

RESERVOIR FOR MERCURY INSTRUMENTS

Harold J. Lawrence, Chicago, Ill., assignor to Stromberg Motoscope Corporation, Chicago, Ill., a corporation of Illinois Application July 5, 1934, Serial No. 733,753

3 Claims. (Cl. 73—31)

This invention relates to improvements in manometers or other similar type instruments wherein mercury is used as the indicating medium, and refers specifically to means whereby the instrument may be handled, shipped, etc., without displacing the mercury within the instrument.

In gauges and instruments wherein mercury confined in capillary tubes is used as the indicating medium, difficulty is encountered in maintaining the mercury mass in an integral state. If air finds its way into the tube the mercury separates into a series of globules interspersed by pockets of air and true readings with the instrument in this condition are rendered impossible. The mercury is usually disintegrated, in the manner described above, by tilting, inverting or violently shaking the instrument which treatment the instrument usually undergoes in being shipped. In addition, in view of the fact that many such instruments are calibrated with respect to a definite volume of mercury, if during shipment, for instance, some of the mercury is lost or otherwise due to improper handling, escapes from the tube, the instrument is rendered inaccurate and useless for its intended purpose.

As a feature of my invention, I provide means, in conjunction with a mercury instrument of the type described, for temporarily isolating a measured quantity of mercury, which, in its isolated state cannot escape while the instrument is being shipped or otherwise handled, and which can be quickly and conveniently introduced into the instrument proper when the same is to be used.

Other objects and advantages of my invention will be apparent from the accompanying drawing and following detail description.

In the drawing, Fig. 1 is a front elevational view of an instrument utilizing mercury as an indicating medium, the mercury being isolated for shipping or handling of the instrument.

Fig. 2 is a fragmentary view similar to Fig. 1 showing the mercury in operative position.

Referring in detail to the drawing, 1 indicates a measuring instrument of the manometer type, the instrument being mounted upon a suitable support 2 by means of fasteners 3. It is to be understood, of course, that although a manometer is shown and described in conjunction with my invention, the same is equally applicable to other instruments and gauges of the mercury type.

The instrument 1 comprises an elongated straight glass capillary tube 4, having a bulbous portion 5 at its upper end which may be blocked off at its top by partition 6. The upper continuation 7 of tube 4 may be connected to a flexible rubber tube 8 which, in turn, may connect with tube 9. Tube 9 may be connected by suitable means to a source of reduced pressure or vacuum, the value of which is to be measured. A small tube 10 may establish communication between the continuation 7 and bulbous portion 5, said tube being in the form of an inverted question mark whereby in the event of unintended inversion of the instrument, mercury from tube 4 will not escape to tube 9. A scale 11 may be positioned upon support 2 immediately behind tube 4 and is adapted to indicate in inches the height to which the mercury column rises in tube 4.

The bottom of tube 4 may terminate in U-bend 12, the internal cross-section of which is restricted in area as shown at 13 in Fig. 2, for a purpose to be hereinafter described. The opposite leg of the U-bend 12 may communicate with a mercury reservoir 14, which, when the instrument is to be used, contains a body of mercury 15. An upper reservoir 16 may be positioned above reservoir 14 and may be connected to said latter by means of tube 17 interposed in which is stop-cock 18 which may be controlled by handle 19. A glass tube 20 may connect into the lower portion of reservoir 16 and may terminate above said reservoir, the upper end being connected by means of flexible rubber tube 21 to tube 22. A stop-cock 23 may be interposed in tube 20 and may be controlled by handle 24. An intermediate portion of tube 22 may be enlarged, as shown at 25 in Fig. 2, said enlarged portion carrying a quantity of glass wool 26 or other similar material adapted to prevent the introduction of solid impurities into the mercury reservoirs and yet permit the passage of air.

In operation, initially an accurately measured predetermined quantity of mercury 15 is introduced into reservoir 16, cock 18 being closed and cock 23 being opened. When the mercury has thus been introduced cock 23 may be closed thereby isolating said mercury and confining the same in reservoir 16, a portion of tube 17 above cock 18 and a portion of tube 20. The instrument in this condition, specifically, as shown in Fig. 1, may be handled or shipped and may be disposed in any position without danger of losing or trapping the mercury.

When it is desired to use the instrument both cocks 18 and 23 may be opened, the opening of cock 18 permitting the mercury to flow to reservoir 14 and the opening of cock 23 venting reservoir 16. A capillary tube 27 of very fine bore may connect into the upper portion of reservoir 14 whereby the pressure of the air within reservoir 14 due to the introduction of the mercury may be relieved to the atmosphere. This feature facilitates the passage of the mercury from reservoir 16 to reservoir 14. When all of the mercury has been passed from reservoir 16 the same seeks its level in reservoir 14 and tube 4, the quantity of mercury being such that the column in tube 4 rises to the zero point on scale 11. Tube 9 may then be connected to a source of reduced pressure or vacuum and the degree of the vacuum may be ascertained by observance of the height of the column of mercury in tube 4. When the vacuum is broken the column of mercury in tube 4 slowly recedes to the zero position upon the scale 11. If the restriction 13 were not provided, upon the breaking of the vacuum, the column would drop rapidly within tube 4 leaving globules of mercury clinging to, and trapped within said tube. This, of course, would necessitate jarring of the instrument to reunite the mercury, which procedure may be very inconvenient particularly if the instrument is carried by a stand or is mounted on a wall.

If it is desired to return the mercury 15 from reservoir 14 to reservoir 16, the instrument may be tilted to the right, as viewed in Fig. 2, until the mercury in the lower end of tube 4 is returned beyond the U-bend 12. With both cocks 18 and 23 open, the instrument may be inverted so that the mercury will run down that side of tube 17 and reservoir 16 opposite to the juncture of tube 20 with said reservoir. When all of the mercury has been returned to reservoir 16, both cocks may be closed and the instrument reinverted whereby the position shown in Fig. 1 will obtain.

I claim as my invention:

1. In combination, a capillary tube adapted to carry a column of mercury, a reservoir for a supply of mercury connected to said tube, a second reservoir connected to said first mentioned reservoir and positioned above the same, a valve interposed between said reservoirs, an inlet tube connected into said second reservoir, and a valve controlling said inlet.

2. In combination, a capillary tube adapted to carry a column of mercury, a reservoir for a supply of mercury connected to said tube, a vent for said reservoir, a second reservoir positioned above and connected to said first mentioned reservoir, a valve interposed in said connection, and an inlet having a valve connected to said second reservoir.

3. In combination, a manometer comprising a capillary tube and a reservoir for mercury, a second reservoir connected to said manometer reservoir, a stop-cock interposed in said connection, a vent for said second reservoir connecting into the side wall of said reservoir, and a stop-cock controlling said vent.

HAROLD J. LAWRENCE.